United States Patent [19]
Hebeda et al.

[11] 3,922,199
[45] Nov. 25, 1975

[54] ENZYMATIC HYDROLYSIS OF GRANULAR STARCH

[75] Inventors: Ronald Emil Hebeda, Woodridge; Dennis John Holik, Naperville; Harry Woods Leach, Willowbrook, all of Ill.

[73] Assignee: CPC International Inc., Englewood Cliffs, N.J.

[22] Filed: Jan. 28, 1974

[21] Appl. No.: 437,452

Related U.S. Application Data

[63] Continuation-in-part of Ser. No. 349,899, April 10, 1973, abandoned.

[52] U.S. Cl. ............................. 195/31 R; 195/115
[51] Int. Cl.² ........................................ C12D 13/02
[58] Field of Search ............... 195/31 R, 11, 7, 115

[56] References Cited
UNITED STATES PATENTS 2,583,451  1/1952  Wallerstein et al. .................. 195/11
3,720,583  3/1973  Fisher .............................. 195/31 R

FOREIGN PATENTS OR APPLICATIONS 2,025,748  12/1970  Germany ............................ 195/65

OTHER PUBLICATIONS

*Corn Starch,* Corn Industries Research Foundation, Inc., 1964 (3ed.), pp. 28–32.
Leach et al., *Cereal Chem.,* pp. 34–46 (1961).
Twisk, *Die Starke,* Vol. 32, pp. 228–230 (1970).

*Primary Examiner*—A. Louis Monacell
*Assistant Examiner*—Thomas G. Wiseman
*Attorney, Agent, or Firm*—Albert P. Halluin

[57] ABSTRACT

A process for converting granular starch to a soluble hydrolysate wherein the unconverted starch retains its granular nature. The conversion is accomplished by means of a bacterial alpha-amylase.

19 Claims, No Drawings

ENZYMATIC HYDROLYSIS OF GRANULAR STARCH

BACKGROUND OF THE INVENTION

This application is a continuation-in-part application Ser. No. 349,899, filed Apr. 10, 1973 now abandoned.

The invention of this application relates to the solubilization of granular starch by enzymes, and more particularly to the conversion of granular starch to hydrolytic products.

Starch is a polymeric carbohydrate material of very high molecular weight. Its monomeric units, termed anhydroglucose units, are derived from dextrose, and the complete hydrolysis of starch yields dextrose. In the United States, dextrose is manufactured from corn starch; in Europe from corn starch and potato starch; and in Japan from corn starch and white sweet potato starch.

Until 1960, dextrose was prepared from starch by acid hydrolysis. The method of preparation involved heating starch with hydrochloric or sulfuric acid at temperatures of 120°–145°C, then neutralizing the hydrolysis mixture with sodium carbonate, clarifying, and crystallizing the dextrose. Unforunately, the yield of dextrose is lowered by the formation of relatively large amounts of reversion products, i.e., products which are formed by the recombination of dextrose molecules. Also, because of the high temperature and low pH of the hydrolysis reaction, some of the starch is converted to hydroxymethyl furfural, levulinic acid and color bodies. The formation of such degradation products is irreversible and, to the extent they are formed, the yield of desired dextrose is of course adversely affected. Still further, the use of hydrochloric acid, or in some instances, sulfuric acid, and the subsequent neutralization of this acid with alkali results in the formation of inorganic salts which interfere with crystallization of the final dextrose product.

Later, hydrolysis of starch to dextrose was accomplished by means of enzymes. The principal enzyme used for such purpose was, and continues to be, glucoamylase. This enzyme effectively hydrolyzes the starch by cleaving one molecule of dextrose at a time from the starch molecule. As a practical matter, however, it is necessary first to thin the starch before subjecting it to the action of glucoamylase. This thinning step may be accomplished either by means of acid or enzyme. The starch is thinned to a D.E. of about 10–20, then treated with glucoamylase. This two-stage process is referred to as an acidenzyme process or an enzyme-enzyme process, depending upon the nature of the thinning step employed.

In the case of the acid-enzyme process, the initial acid-thinning step also requires a rather high temperature, i.e., in the order of 120°C. This of course produces starch fragments that readily retrograde, and also produces reversion products. As expected, these occur at the expense of the desired formation of dextrose.

The same is characteristic of the enzyme-enzyme process which also requires a relatively high temperature for the thinning step, viz., 85°–95°C. Furthermore, it is usual practice to heat the thinned starch at still higher temperatures, viz., of the order of 120°–160°C, to complete gelatinization of the starch and to improve filtration. In addition, certain fatamylose complexes are formed which are quite insoluble and cause filtration difficulties.

None of these processes is entirely free of processing difficulties because of the inevitable presence of retrogradation products, starch-fat complexes and reversion products. To the extent that these are formed, processing difficulties are encountered particularly in the filtration of the product mixture, and the yield of dextrose is diminished.

Wallerstein et al (u.s. Pat. No. 2,583,451) disclose an enzymatic hydrolysis process which does not utilize a high temperature, gelatinization step, but the yields of dextrose are quite low. Leach et al, Cereal Chemistry, Vol. 38, No. 1, January, 1961, pp. 34–46, likewise show the enzymatic hydrolysis of granular starch, with various alpha-amylases, but at low temperatures.

It is accordingly a principal object of the present invention to provide an improved process for the conversion of starch to dextrose.

It is another object of the present invention to provide a process for the solubilization of granular starch.

It is another object of the present invention to provide such a process which results in high yields of dextrose.

It is another object of the present invention to provide such a process which is characterized by the substantial absence of the above processing difficulties.

It is another object of the present invention to provide such a process which is characterized also by relatively low temperatures.

It is yet another object of the present invention to provide such a process which can be carried out conveniently and economically in one step.

SUMMARY OF THE INVENTION

These and other objects are accomplished by a process for solubilizing starch comprising mixing a granular starch with water, a bacterial alpha-amylase and glucoamylase, at a temperature between the normal initial gelatinization temperature and the actual gelatinization temperature of the starch, and at a pH of from about 5.0 to about 7.0. Such process accomplishes the above objectives largely because of the combined action of the bacterial alpha-amylase and glucoamylase which results in increased solubilization of the starch, as well as increased yields of dextrose. Alternatively, these objects may be accomplished by the action of bacterial alpha-amylase alone, i.e., in the absence of glucoamylase. That is, granular starch, water and a bacterial alpha-amylase are mixed under the above conditions, to produce a soluble starch hydrolysate.

The starch may be any of those commonly available, including corn starch, waxy maize starch, tapioca starch, potato starch, white sweet potato starch, wheat starch, sago starch, sorghum starch, high amylose starch and the like. Waxy and the non-waxy starches are suitable. As indicated, the starch is granular. Corn grits and other raw materials high in starch content may be used satisfactorily.

An important advantage of the process is that it may be carried out in an aqueous slurry at relatively high concentrations. The solids content of the starch slurry is generally within the range of from about 5 to about 40% although ordinarily the solids content will be 10–30%. Lesser concentrations can of course be used, and in general as the concentration is decreased, so is the extent of starch solubilization increased, and thus the yield of dextrose is increased. As a practical matter, however, it is highly desirable in most instances to use smaller volumes, i.e., higher concentrations of starch.

This avoids or at least diminishes the considerable expense of concentrating the conversion mixture prior to crystallization. In some cases, however, the advantage of the present invention may be sufficient to outweigh this disadvantage, and a concentration of about 10% solids would be preferred.

The process herein permits the solubilization of virtually all of the starch in a 25% aqueous slurry, within a period of 24 hours. Furthermore, at higher concentrations any undissolved starch can be recycled so as to improve the overall efficiency; i.e., to solubilize more than 90% of the starch.

The bacterial alpha-amylase preferably is one which is active within the pH range of from about 4.0 to about 7.0 and which possesses appreciable activity at relatively low temperatures, i.e., below the temperature at which a particular starch gelatinizes. Preferred sources of such alpha-amylases include certain species of the Bacillus microorganism, viz., B. subtilis, B. licheniformis, B. coagulans and B. amyloliquefaciens. Suitable alpha-amylases are described in Austrian patent application No. 4836/70 and in U.S. Pat. No. 3,697,378. Especially suitable amylases are those derived from B. licheniformis as described in the above Austrian patent application. Particularly preferred is that alpha-amylase derived from B. licheniformis strain NCIB 8061; other specific microorganisms include B. licheniformis strains NCIB 8059, ATCC 6598, ATCC 6634, ATCC 8480, ATCC 9945A and ATCC 11945. They are unusually effective in the liquefaction of granular starch, i.e., when used in the substantial absence of glucoamylase. One such enzyme is identified by the trade name "Thermamyl," available from Novo Enzyme Corporation, Mamaroneck, N.Y. For such use the alpha-amylase should be used in a concentration ranging from about 0.1 to about 25 units per gram of starch (dry basis) under conditions of pH and temperature set out earlier herein. Thermamyl is characterized by the following properties:

a. it is thermally stable;
b. it is active throughout a wide range of pH; and
c. its activity and heat stability are less dependent than other alpha-amylases on the presence of added calcium ion.

Typical analyses of three different Thermamyl preparations are as follows:

|  | Thermamyl 60 | Thermamyl 120 | Thermamyl |
| --- | --- | --- | --- |
| Dry Substance, % | 35.4 | 98.8 | 94.6 |
| Alpha-amylase activity, U/g (as is) | 1,156 | 2,105 | 9,124 |
| Protein, % d.b. | 26.5 | 21.2 | 21.2 |
| Ash, % d.b. | 60.1 | 91.2 | 64.4 |
| Calcium, % d.b. | 0.04 | 0.72 | 4.9 |
| Sodium, % d.b. | 12.3 | 12.2 | — |

Still other suitable alpha-amylases which are available include the following:

TABLE I

| Enzyme Preparation | Company | Form | Activity |
| --- | --- | --- | --- |
| Rhozyme H-39 | Rohm & Haas | Powder | 4,874 U/g |
| Takamine HT-1000 | Miles | Powder | 3,760 U/g |
| Tenase | Miles | Liquid | 2,043 U/ml |
| Dex-Lo MM | Wallerstein | Liquid | 1,213 U/ml |
| Novo SP-96 | Novo | Powder | 7,310 U/g |
| Novo B. subtilis | Novo | Liquid | 1,599 U/ml |
| Kleistase GM-16 | Daiwa Kasai | Powder | 26,593 U/g |
| Kleistase L-1 | Daiwa Kasai | Liquid | 1,918 U/ml |

TABLE I-continued

| Enzyme Preparation | Company | Form | Activity |
| --- | --- | --- | --- |
| Rapidase SP-250 | Societe "Rapidase" France | Powder | 11,655 U/g |

The amount of bacterial alpha-amylase to be used ranges from about 0.1 to about 25 units per gram of starch (dry basis). The use of larger amounts provides no practical advantage; the increased starch solubilization which results from the use of more than 25 units per gram does not justify the additional cost of enzyme. The optimum quantity of alpha-amylase depends upon the quantity of glucoamylase, and vice versa. A preferred range of concentration of alpha-amylase is from about 1.0 to about 10 units per gram of starch (dry basis).

The alpha-amylase activity of an enzyme is determined as follows:

The enzyme is allowed to react with a standard starch solution under controlled conditions. Enzyme activity is determined by the extent of starch hydrolysis, as reflected by a decrease in iodine-staining capacity, which is measured spectrophotometrically. The unit of bacterial alpha-amylase activity is the amount of enzyme required to hydrolyze 10 mg. of starch per minute under the conditions of the procedure. The method is applicable to bacterial alpha-amylases, including industrial preparations, except materials which possess significant saccharifying activity.

From 0.3 to 0.5 gram of solid sample or from 0.3 to 1.0 ml. of a liquid sample is dissolved in a sufficient quantity of 0.0025 M aqueous calcium chloride to give an enzyme solution containing approximately 0.25 unit of activity per ml.

A mixture of 10 ml. of 1% Lintner starch solution, equilibrated to 60°C, and 1 ml. of the enzyme sample to be tested is mixed and held in a 60°C constant temperature bath for exactly 10 minutes. A 1-ml. sample is removed and added to a mixture of 1 ml. of 1 M aqueous hydrochloric acid and about 50 ml. of distilled water. The iodine-staining capacity of such acidified sample then is determined by adding 3.0 ml. of 0.05% aqueous iodine solution, diluting to 100 ml. with distilled water, and mixing well. The absorbance of the solution, relative to that of distilled water, is measured at 620 mm, in a 2-cm. cell. A similar measurement is made of the standard starch solution (to which water is added instead of the enzyme solution) to provide a blank absorbance.

The enzyme activity, in units/gram or /ml. is equal to $$\frac{(\text{Blank Absorbance} - \text{Sample Absorbance}) \times \text{Dilution Factor} \times 50}{\text{Blank Absorbance} \times 10 \times 10}$$

The glucoamylase may be any of the well-known fungal amylase preparations, particularly those derived from members of the Aspergillus genus, the Endomyces genus or the Rhizopus genus. A particularly preferred glucoamylase is that available from the process described in U.S. Pat. No. 3,042,584 (Kooi et al) whereby a fungal amylase preparation is freed of undesired transglucosidase activity by treatment in an aqueous medium with a clay material. The amount of glucoamylase to be used ranges from about 0.05 unit to about 5.0 units per gram of starch (dry basis). Preferably, on an enzyme cost/performance basis, about 0.1 to about 0.3 unit of glucoamylase per gram of starch (dry basis) is used.

Glucoamylase activity units are determined as follows:

The substrate is a 15–18 D.E. acid hydrolysate of corn starch dissolved in water and diluted to 4.0 grams of dry substance per 100 ml. of solution. Exactly 50 ml. of the solution is pipetted into a 100 ml. volumetric flask. To the flask is added 5.0 ml. of 1.0 molar sodium acetate-acetic acid buffer (pH: 4.3). The flask is placed in a water bath at 60°C and after 10 minutes the proper amount of enzyme preparation is added. At exactly 120 minutes after addition of the enzyme preparation the solution is adjusted to a phenolphthalein endpoint with one normal sodium hydroxide. The solution is then cooled to room temperature, and diluted to volume. A reducing sugar value, calculated as dextrose, is determined on the diluted sample and on a control with no enzyme preparation added. Glucoamylase activity is calculated as follows:

$$A = \frac{S - B}{2 \times E}$$

where
A = glucoamylase activity units per ml. (or per gram) of enzyme preparation.
S = reducing sugars in enzyme converted sample, grams per 100 ml.
B = reducing sugars in control, grams per 100 ml.
E = amount of enzyme preparation used, ml. (or grams). S should not exceed 1.0 grams per 100 ml.

The temperature of the reaction mixture of the process herein should as indicated between the normal initial gelatinization temperature and the actual gelatinization temperature of the starch. Ordinarily, the temperature will be at the upper end of this range. A particular advantage of the process is the fact that high temperatures are avoided. This permits a considerable savings in the cost of supplying heat to the process and minimizes the formation of color bodies with a subsequent savings in refining costs. It is interesting to note that the process can be carried out at temperatures above the normal initial gelatinization temperature of a starch without noticeable gelatinization as evidenced by an increase in viscosity. Despite the fact that corn starch, for example, is considered to have a gelatinization temperature range of 62–72°C, i.e., its "normal" gelatinization temperature range, the process of the present invention may be carried out with corn starch at temperatures up to about 80°C without any noticeable increase in viscosity. As a matter of fact, it usually is desirable to carry out the process at these higher temperatures, because of the increased rate and extent of solubilization of starch.

When the reaction is conducted at temperatures exceeding the normal initial gelatinization temperature of the starch, it is desirable to have hydrolysis products present during the reaction. One way of accomplishing this is to add the enzyme(s) to the starch at a temperature equal to or lower than the initial gelatinization temperature, and then to heat the mixture to the desired temperature.

The selection of pH depends upon the particular enzymes used in the process. Ideally, the thinning enzyme and the saccharifying enzyme would exhibit their optimum activities at the same pH, but as a practical matter this is unlikely. Glucoamylase is, of course, the saccharifying enzyme and its optimum activity is exhibited at a pH of about 4.5. Thermamyl, on the other hand, exhibits its optimum activity at a pH of 5.5–7 and is not sufficiently active at a pH below 5 to promote the desired starch solubilization. The same is true generally with respect to other alpha-amylases. Accordingly, a suitable pH for the purpose of invention herein is one falling within the range of from about 5.0 to about 7.0, i.e., where the glucoamylase and alpha-amylase each are suitably active.

A preferred embodiment of the invention involves the method of ultrafiltration. By selection of a suitable semipermeable membrane, the enzyme and unreacted starch may be completely retained by the membrane while the dextrose product, being of lower molecular weight, passes through as it is formed. Ultrafiltration is discussed in "New Separation Technique for the CPI", Chemical Engineering News, 64, No. 12 (1968).

In another preferred embodiment the starch conversion mixture contains an anionic surfactant. In certain concentrations the surfactant enhances the degree of solubilization and yield of dextrose, i.e., in concentrations ranging from about 0.01 to about 1.0%. Best results are obtained with a concentration of anionic surfactant ranging from about 0.05 to about 0.50%. Typical anionic surfactants useful herein include sodium lauryl sulfate, sodium dodecylbenzene sulfonate, sodium wax-substituted napthalene sulfonate, sodium stearate, and triethanolamine alkyl sulfonates where the alkyl group is derived from alcohols produced by the reduction of tallow or coconut oil glycerides. In general, the anionic dispersants herein are water-soluble salts having an alkyl group containing from about 8 to about 20 carbon atoms, a sulfonic acid or sulfuric acid ester radical, and either sodium, potassium, ammonium, or aliphatic amine having fewer than 10 carbon atoms, as the cation.

In still another preferred embodiment the process is carried out in two stages, with respect to the pH of the starch conversion mixture. The first stage conforms to that described above, i.e., the pH is maintained at from about 5.0 to about 7.0, until at least about 10% of the starch has been solubilized, and preferably until the solubilization of starch begins to level off. This occurs in the usual instance after about 16 hours. The conversion mixture may be filtered at this point, if desired. The pH is adjusted down to within the range of from about 4.0 to about 5.0. Within this range the activity of the glucoamylase is greater than at higher pH's and the overall result is a somewhat increased yield of dextrose.

A particularly preferred embodiment, resulting in the formation of substantial proportions of dextrose, comprises the steps of (1) agitating a mixture of a granular starch, water and a bacterial alpha-amylase, at a temperature between the normal initial gelatinization temperature of the starch and the actual gelatinization temperature of the starch and at a pH of from about 5.0 to about 7.0, to convert at least 10% of the starch to a soluble hydrolysate; and (2) adjusting the temperature to 50°–65°C and the pH to 4.0–4.8, and adding glucoamylase to saccharify the soluble hydrolysate. Step (1) generally requires about 12 hours; step (2) on the other hand ordinarily will require a much longer time, i.e., from about 24 hours to about 120 hours. In some instances, it is desirable to add glucoamylase to the mixture in step (1). The amounts of alpha-amylase and glucoamylase used in step (1) are the same as specified earlier herein for the conversion of granular starch to soluble hydrolysate in one step.

The above additional amount of glucoamylase employed in the second stage ranges from about 0.1 to about 1.0 units of activity per gram of dry starch.

The starch hydrolysis product may be worked up in the usual manner, i.e., by concentration and crystallization.

A typical procedure for an enzymatic hydrolysis as described above is as follows:

A slurry containing 125 parts of starch (dry basis) and 350 parts of distilled water is prepared in a 1-liter stainless steel beaker. Calcium is added if desired (as in the case of the use of alpha-amylases other than Thermamyl), in the form of an aqueous calcium chloride solution containing 40 mg. of calcium per milliliter, to increase the total amount of calcium present in the slurry by 100 ppm (the starch contains some calcium, and so does the alpha-amylase). The pH is adjusted to 5.5 by the addition of dilute aqueous sodium hydroxide; bacterial alpha-amylase and glucoamylase are added and the total weight of the slurry adjusted to 500 parts by the addition of distilled water. The beaker is placed in a water bath, the contents stiffed and heated to 60°–75°C and held at that temperature for the indicated time of reaction; the pH is checked periodically and readjusted to 5.5 when necessary. The product then is filtered and the filter cake washed, dried and weighed to ascertain the portion of starch remaining unsolubilized. The following data obtained via this procedure is illustrative. In each case the data is based on use of a 25–30% aqueous slurry of granular corn starch at a pH of 5.5 and a temperature of 65°–75°C.

When the conversions are conducted at 65°–75°C (well above the reported initial gelatinization temperature of corn starch) the non-solubilized starch retains its granular nature throughout the course of the conversion.

TABLE II

| Run No. | Starch % Conc. | Enzyme-Dose[a] BAA[b] | GA[c] | Hrs. | Time Temp. | % Sol.[d] |
|---|---|---|---|---|---|---|
| 1 | 30 | 2 Th[e] | 0.25 | 24 | 65°C | 74.8 |
| 2 | 30 | 2 Th | 0.14 | 24 | 65°C | 76.4 |
| 3 | 30 | 2 Th | 0.25 | 24 | 70°C | 89.2 |
| 4 | 30 | 2 Th | 0.14 | 24 | 70°C | 88.7 |
| 5 | 25 | 2 Th | 0.14 | 26[f] | 75°C | 97.6 |
| 6 | 25 | 2 Th | 0.14 | 50[g] | 75°C | 94.8 |
| 7 | 25 | 10 B-221[h] | 0.14 | 26[f] | 75°C | 96.1 |
| 8 | 25 | 10 B-221 | 0.14 | 50[g] | 75°C | 96.4 |
| 9 | 25 | 2 Th | 0.14 | 25 | 65°C | 80.4 |
| 10 | 25 | 2 Th | 0.14 | 24 | 70°C | 89.2 |
| 11 | 25 | 2 Th | 0.14 | 22 | 75°C | 93.2 |
| 12 | 30 | 2 Th | 0.25 | 48[i] | 65°C | 77.0 |

[a]units per gram of starch
[b]bacterial alpha-amylase
[c]glucoamylase
[d]% of starch solubilized
[e]Thermamyl
[f]60–75°C for 2 hours, 75°C for 24 hours
[g]60°C for 24 hours, then as in f)
[h]derived from a Bacillus subtilis microorganism and having an activity of 3910 L/g
[i]60°C for 24 hours, 65°C for 24 hours The solubilizing influence of alpha-amylases alone on granular starch, at the elevated temperatures of this invention is shown by the data in Table III. In each case a starch slurry containing 25 or 30% of granular starch is agitated with an alpha-amylase at 60°–75°C, at a pH of 5.5, for about 25 hours.

TABLE III

| Run No. | Starch % Conc. | BAA Dose[a] | Time Hrs. | Temp. | % Sol.[b] |
|---|---|---|---|---|---|
| 1 | 30 | 2 Th | 24 | 65°C | 61.1 |
| 2 | 30 | 2 Th | 24 | 70°C | 72.9 |
| 3 | 25 | 1 Th | 26[c] | 75°C | 94.7 |
| 4 | 25 | 2 Th | 26[c] | 75°C | 96.6 |
| 5 | 25 | 10 Th | 26[c] | 75°C | 97.3 |
| 6 | 25 | 1 Tenase | 26[c] | 75°C | 89.8 |
| 7 | 25 | 2 Tenase | 26[c] | 75°C | 93.0 |
| 8 | 25 | 10 Tenase | 26[c] | 75°C | 95.2 |

[a]units per gram of starch
[b]% of starch solubilized
[c]60–75°C for 2 hours, 75°C for 24 hours As pointed out earlier herein, a particularly preferred embodiment of the invention involves the preparation of dextrose via a 2-stage process: in the first stage the granular starch is converted to a starch hydrolysate by treatment with an alpha-amylase, either alone or in combination with glucoamylase, at a temperature between the normal initial gelatinization temperature and the actual gelatinization temperature of the starch and at a pH of 5–7; then in the second stage the temperature is lowered to 50°–65°C, the pH is lowered to 4.0–4.8 and additional glucoamylase is added. These conditions are maintained for 24-120 hours. Data obtained from such a 2-stage process, wherein the combination of alpha-amylase and glucoamylase is used in the first stage is shown in Table IV. In each case the starch slurry contains 25% starch and, in the second stage, an additional 0.14 unit of glucoamylase is added after adjusting the temperature to 60°C and the pH (from 5.5 in the first stage) to 4.3.

TABLE IV

| Run No. | 1st Stage | 2nd Stage[a] | % Dextrose[b] |
|---|---|---|---|
| 1 | as in No. 5, Table II | 120 hrs. | 95.3 |
| 2 | as in No. 6, Table II | 96 hrs. | 95.6 |
| 3 | as in No. 7, Table II | 120 hrs. | 94.9 |
| 4 | as in No. 8, Table II | 96 hrs. | 96.2 |
| 5 | as in No. 9, Table II | 55 hrs. | 97.6 |
| 6 | as in No. 10, Table II | 90.5 hrs. | 98.4 |
| 7 | 2 Th + 0.14 GA at 73°C for 24 hrs. | 42 hrs. | 96.5 |
| 8 | 2 Th + 0.14 GA at 73°C for 12 hrs. | 82 hrs. | 96.5 |
| 9 | 2 Th + 0.14 GA at 75°C for 12 hrs. | 86 hrs. | 96.8 |
| 10 | as in No. 11, Table II | 80 hrs. | 95.8 |

[a]0.14 GA at 60°C
[b]based on solids in the filtrate

Additional data obtained from similar runs wherein alpha-amylase is used alone in the first stage is set forth in Table V. In each case the starch slurry contains 30% of starch.

TABLE V

| Run No. | 1st Stage | 2nd Stage | % Sol. | % Dextrose[a] |
|---|---|---|---|---|
| 1 | 2 Th at 60–75°C for 2 hrs., 75°C for 24 hrs.; pH, 5.5 | 0.14 GA at 60°C for 120 hrs; pH, 4.3 | 97.2 | 95.3 |
| 2 | 2 Th at 60°C for 24 hrs., 60–75°C for 2 hrs., 75°C for 24 hrs.; pH, 5.5 | 0.14 GA at 60°C for 96 hrs.; pH, 4.3 | 96.2 | 95.2 |
| 3 | 10 B-221 at 60–75°C for 2 hrs., 75°C for 24 hrs.; pH 5.5 | 0.14 GA at 60°C for 120 hrs.; pH, 4.3 | 94.2 | 94.8 |
| 4 | 10 B-221 at 60°C for 24 hrs., 60–75°C for 2 hrs., 75°C for 24 hrs.; pH, 5.5 | 0.14 GA at 60°C for 96 hrs.; pH, 4.3 | 95.1 | 93.3 |
| 5 | 2 Kleistase at 60–75°C for 2 hrs., 75°C for 24 hrs.; pH, 5.5 | 0.14 GA at 60°C for 96 hrs.; pH, 4.3 | 93.2 | 94.8 |
| 6 | 10 Kleistase at 60–75°C for 2 hrs., 75°C for 24 hrs.; pH, 5.5 | 0.14 GA at 60°C for 96 hrs.; pH, 4.3 | 94.9 | 93.2 |

[a] based on solids in the filtrate

All parts and percentages herein are by weight unless otherwise expressly state.

While the invention has been described in connection with specific embodiments thereof, it will be understood that it is capable of further modification, and this application is intended to cover any variations, uses or adaptations of the invention following, in general, the principals of the invention and including such departures from the present disclosure as come within known or customary practice in the art to which the invention pertains and as may be applied to the essential features hereinbefore set forth, and as fall within the scope of the invention.

What is claimed is:

1. A process for directly converting granular starch to a soluble starch hydrolysate, comprising:
   agitating a mixture of granular starch, water and an alpha-amylase enzyme preparation at a temperature in the range from the normal initial gelatinization temperature to the actual gelatinization temperature of the starch, at a pH of from about 4.0 to about 7.0, maintaining said conditions for period of time to produce a soluble starch hydrolysate, and
   recovering from said mixture the soluble starch hydrolysate, whereby any residual, non-soluble starch has substantially retained its granular, ungelatinized form.

2. The process of claim 1, wherein the starch is corn starch.

3. The process of claim 1, wherein the concentration of starch is from about 5 to about 40%, by weight.

4. The process of claim 1, wherein the concentration of the alpha-amylase is from about 0.1 unit to about 25 units of activity per gram of starch.

5. The process of claim 1, wherein the alpha-amylase is a bacterial alpha-amylase.

6. The process of claim 1, wherein the alpha-amylase is added to the granular starch and water at a temperature equal to or lower than the initial gelatinization temperature of the starch to produce hydrolysate products in the mixture and thereafter heating the mixture to a temperature of from about 60°C. to the actual gelatinization temperature of the starch.

7. The process of claim 1, wherein said alpha-amylase is derived from *Bacillus licheniformis*.

8. The process of claim 1, wherein the conversion is conducted at a tempertature in the range of from about 60°C. to about 80°C.

9. The process of claim 1, wherein the conversion is conducted at a temperature of from about 60°C. to about 75°C.

10. The process of claim 1, wherein the residual, insoluble starch is recycled.

11. A process for directly converting granular starch to a soluble starch hydrolysate, comprising:
    agitating a mixture of granular starch, water and an alpha-amylase enzyme preparation derived from *Bacillus licheniformis*, wherein the starch is present at a concentration in the range from about 5% to about 40% by weight of the mixture, and the alpha-amylase is present in the range from about 0.1 to about 25 units of activity per gram of starch,
    converting and solubilizing the granular starch in said agitated mixture at a temperature in the range from the normal initial gelatinization temperature of the starch to the actual gelatinization temperature of the starch, maintaining said conditions for a period of time to produce a soluble starch hydrolysate, and
    recovering from said mixture the soluble starch hydrolysate whereby any residual non-soluble starch is substantially retained its granular, ungelatinized from.

12. The process of claim 11, wherein the conversion and solubilization is conducted at a temperature in the range of from about 60°C. to about 75°C.

13. The process of claim 11, wherein said starch is corn starch.

14. The process of claim 11, wherein said alpha-amylase is derived from a *Bacillus licheniformis* strain of the group consisting of NCIB 8061, NCIB 8059, ATCC 6598, ATCC 6634, ATCC 8480, ATCC 9545A and ATCC 11945.

15. A process for directly converting granular corn starch to a soluble corn starch hydrolysate, comprising:
    agitating a mixture of granular corn starch, water and an alpha-amylase derived from *Bacillus licheniformis*, wherein the starch is present at a concentration in the range from about 10% to about 30% by weight of the mixture, and the alpha-amylase is present in the range from about 10 units of activity per gram of corn starch,
    converting and solubilizing the corn starch in said agitated mixture at a temperature in the range from the normal initial gelatinization temperature to the actual gelatinization temperature of the corn starch, at a pH of from about 4.0 to about 7.0, maintaining said conditions for a period of time until at least 90% of the corn starch is hydrolyzed to a soluble starch hydrolysate, and
    recovering from said mixture the soluble corn starch hydrolysate whereby any residual, non-soluble starch has substantially retained its granular, ungelatinized form.

16. The process of claim 15, wherein the conversion and solubilization is conducted at a temperature in the range of from about 60°C. to about 75°C.

17. The process of claim 15, wherein an anionic surfactant is added to said agitated mixture in an amount ranging from about 0.01% to about 1.0%, by weight of the agitated mixture.

18. The process of claim 15, wherein the agitated mixture, in a first step is heated to a temperature of about 60°C., and in a subsequent step heated to a temperature of about 75°C. until at least about 90% of the granular corn starch is hydrolyzed.

19. The process of claim 15, wherein the conversion and solubilization is conducted in an ultrafiltration cell wherein the enzyme preparation and insoluble starch are retained in the cell and the soluble corn starch hydrolysate is passed through a semipermeable membrane of said ultrafiltration cell.

* * * * *